(12) United States Patent
Hammoud et al.

(10) Patent No.: US 11,915,177 B1
(45) Date of Patent: Feb. 27, 2024

(54) AUTOMATICALLY RECOMMENDING COMMUNITY SOURCING EVENTS BASED ON OBSERVATIONS

(71) Applicant: COUPA SOFTWARE INCORPORATED, San Mateo, CA (US)

(72) Inventors: Raja Hammoud, Mountain View, CA (US); Donna Wilczek, Sonoma, CA (US); Carl Rydbeck, San Mateo, CA (US); Pallavi Mathane, Mountain View, CA (US)

(73) Assignee: Coupa Software Incorporated, San Mateo, CA (US)

( * ) Notice: Subject to any disclaimer, the term of this patent is extended or adjusted under 35 U.S.C. 154(b) by 0 days.

(21) Appl. No.: 17/970,010

(22) Filed: Oct. 20, 2022

Related U.S. Application Data

(63) Continuation of application No. 16/591,379, filed on Oct. 2, 2019, now Pat. No. 11,580,470.

(51) Int. Cl.
  *G06Q 10/0631* (2023.01)
  *G06Q 10/087* (2023.01)
  *G06F 16/33* (2019.01)
  *G06N 20/00* (2019.01)

(52) U.S. Cl.
  CPC ..... *G06Q 10/06315* (2013.01); *G06Q 10/087* (2013.01); *G06F 16/3344* (2019.01); *G06N 20/00* (2019.01)

(58) Field of Classification Search
  USPC ........................................................ 705/7.25
  See application file for complete search history.

(56) References Cited

U.S. PATENT DOCUMENTS

| | | |
|---|---|---|
| 6,865,546 B1 | 3/2005 | Song |
| 6,980,966 B1 | 12/2005 | Sobrado et al. |
| 7,584,123 B1 | 9/2009 | Karonis et al. |
| 7,702,540 B1 | 4/2010 | Woolston |
| 8,712,868 B2 | 4/2014 | Foster et al. |
| 9,235,848 B1 | 1/2016 | Gourley et al. |
| 2001/0032175 A1* | 10/2001 | Holden ............... G06Q 40/04 705/26.1 |

(Continued)

OTHER PUBLICATIONS

Chang, Hsin Hsin. "Task-technology fit and user acceptance of online auction." International Journal of Human-Computer Studies 68.1-2 (2010): 69-89 (Year: 2010).*

(Continued)

*Primary Examiner* — Darlene Garcia-Guerra
(74) *Attorney, Agent, or Firm* — Baker Botts L.L.P.

(57) ABSTRACT

A computer-implemented method for improving efficiency in an electronic procurement system for sourcing resources, comprising, during digital electronic interactions of a buyer computer with one or more software platforms and without receiving explicit request for recommendations from the buyer computer: automatically generating, at a coding computer, implicit observation data of the buyer computer; automatically determining, at the coding computer, one or more active sourcing events from a plurality of sourcing events, based on at least the implicit observation data of the buyer computer; using the coding computer, causing to display at least one of the one or more active sourcing events in a graphical user interface.

21 Claims, 8 Drawing Sheets

(56) References Cited

U.S. PATENT DOCUMENTS

| | | |
|---|---|---|
| 2002/0099638 A1 | 7/2002 | Coffman et al. |
| 2002/0156686 A1 | 10/2002 | Kraft et al. |
| 2003/0216971 A1 | 11/2003 | Sick et al. |
| 2004/0117242 A1 | 6/2004 | Conrad et al. |
| 2006/0079260 A1 | 4/2006 | Tillet et al. |
| 2007/0016514 A1 | 1/2007 | Al-Abdulqader et al. |
| 2008/0004977 A1* | 1/2008 | Fisher ................ G06Q 30/08 705/26.3 |
| 2008/0077574 A1 | 3/2008 | Gross |
| 2009/0030835 A1 | 1/2009 | Burns et al. |
| 2009/0327148 A1 | 12/2009 | Kamar et al. |
| 2011/0022497 A1* | 1/2011 | Scifres ............. G06Q 30/0641 705/7.36 |
| 2011/0087556 A1 | 4/2011 | Pitkow |
| 2012/0209839 A1 | 8/2012 | Andrews et al. |
| 2012/0259844 A1* | 10/2012 | Yuan ............... G06F 16/24578 707/723 |
| 2012/0290395 A1 | 11/2012 | Mesaros |
| 2013/0073335 A1* | 3/2013 | Tang ................... G06Q 30/02 705/7.29 |
| 2013/0325870 A1 | 12/2013 | Rouse et al. |
| 2014/0172616 A1 | 6/2014 | Leahy et al. |
| 2015/0039388 A1* | 2/2015 | Rajaraman ......... G06Q 30/0613 705/7.29 |
| 2015/0073929 A1* | 3/2015 | Psota ............... G06Q 30/0605 705/26.2 |
| 2015/0134389 A1 | 5/2015 | Punera et al. |
| 2016/0019571 A1* | 1/2016 | Rivas .................... G06Q 30/08 705/14.12 |
| 2016/0048898 A1 | 2/2016 | Irish |
| 2016/0142450 A1 | 5/2016 | Paul et al. |
| 2016/0210602 A1* | 7/2016 | Siddique .............. G06T 17/00 |
| 2016/0373891 A1 | 12/2016 | Ramer et al. |
| 2017/0053558 A1 | 2/2017 | Zhou et al. |
| 2017/0364978 A1* | 12/2017 | Loeb ..................... G06Q 30/08 |
| 2018/0033081 A1* | 2/2018 | Karas .................... G06Q 30/08 |
| 2019/0050945 A1 | 2/2019 | Ash et al. |
| 2019/0272202 A1 | 9/2019 | Bhagat et al. |
| 2019/0272295 A1 | 9/2019 | Kamath et al. |
| 2019/0362317 A1* | 11/2019 | Rogynskyy ............ H04L 41/14 |

OTHER PUBLICATIONS

C. Hu, Yifan, Yehuda Koren, and Chris Volinsky. "Collaborative filtering for implicit feedback datasets." 2008 Eighth IEEE international conference on data mining. Ieee, 2008 (Year: 2008).*

Kauffman, Robert J., Hsiangchu Lai, and Chao-Tsung Ho. "Incentive mechanisms, fairness and participation in online group-buying auctions." Electronic Commerce Research and Applications 9.3 (2010): 249-262 (Year: 2010).*

Eng, Teck-Yong "The role of e-marketplaces in supply chain management" Industrial Marketing Management 33.2 (2004) 15 pages.

Atterer, Richard, Monika Wnuk, Albrecht Schmidt, "Knowing the user's every move: user activity tracking for website usability evaluation and implicit interaction" Proceeding of the 15th international conference on World Wide Web (2006) 10 pages.

Constantinov, Calin, Andrei Mocanu, Elvira Popescu, "Online auctioning and recommendations: The eBidLand platform" 16th International Conference on System Theory, Control and Computing (ICSTCC), IEEE (2012) 6 pages.

Hur, Daesik, Janet L. Hartley, Vincent A. Mabert, "Implementing reverse e-auctions: A learning process" Business Horizons 49.1 (2006) 9 pages.

* cited by examiner

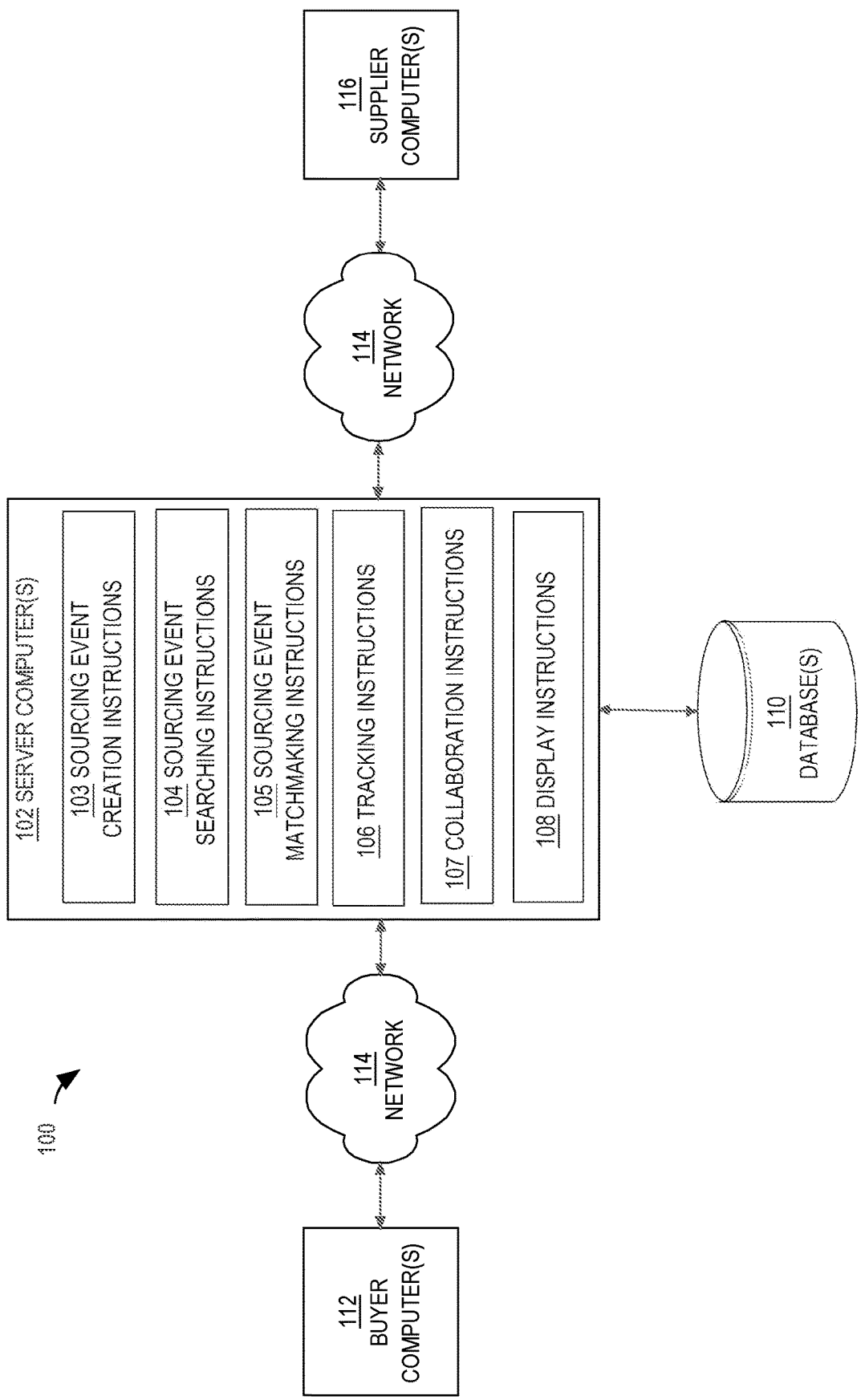

Collaboration

Pooling Community Spend Power — Real-Time Data from the Coupa Community

Source Together | Envision Together

New Source Together Event Create

Event Description — 602

*Event Name
*Event Description
Commodities
Geographies to source to
*Start Date 12/12/2019
*End Date 12/12/2019

Your Information 606

Event Creator  Company Name
Your Name     Mark Lucas
Your Email    mark.lucas@email.com
Profile Picture

*Your own demand

Help & Learn
Request assistance or learn more about Source Together

Event Status — 604

● Collecting Interest
  Assessing participated interest

○ In Progress
  Sourcing items/ services

○ Complete
  Completed and closed event

600

AUTOMATICALLY RECOMMENDING COMMUNITY SOURCING EVENTS BASED ON OBSERVATIONS

BENEFIT CLAIM

This application claims the benefit as a continuation of application Ser. No. 16/591,379, filed Oct. 2, 2019, the entire contents of which is hereby incorporated by reference for all purposes as if fully set forth herein. Applicant hereby rescinds any disclaimer of subject matter occurring in prosecution of the priority application(s) and advises the USPTO that the claims of this application may be broader than the claims of any priority application(s).

TECHNICAL FIELD

One technical field of the present disclosure is recommendation systems. Another technical field is systems for sourcing resources that processes observations to recommend community sourcing events, including computer-implemented e-procurement systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Electronic procurement or e-procurement has developed as a discrete technical field or technology in which programmed computers are applied to the telecommunication problem of how to connect distant user accounts associated with buyers and suppliers, negotiate terms of contracts for the supply of tangible or intangible goods or services, and track purchase orders, invoicing and payment. E-procurement is often practiced using networks of distributed computers and software-as-a-service or SaaS based online applications.

Computer-implemented sourcing, in e-procurement, is the technical process by which a buyer computer expresses decisions about supplier computers to contract with for goods or services that are purchased. Sourcing events allow buyer computers to digitally interact with other buyer computers to improve the efficiency of data transmissions relating to transactions and increase total purchasing power to more efficiently complete transactions with supplier computers. Third-party teams of computers run sourcing events and digitally negotiate on behalf of participants of the sourcing events. Participants lack visibility of other participants and do not have an ability to exchange communication amongst themselves or to negotiate for themselves and must rely on third-party teams. Fees associated with searching potential supplier computers and negotiating often result in inefficient sourcing solutions.

Computer-implemented sourcing solutions allow participant computers to search for sourcing events to participate in and to create their own sourcing event when they do not find any relevant sourcing events to join. Performing repeated searches to find a particular sourcing event to participate in is labor intensive and wastes tremendous amounts of computing resources including power, storage, and network bandwidth. Another inefficiency is creating redundant sourcing events for same or similar goods or services when a sourcing event is not found; that is, a buyer account of a first buyer computer could create a sourcing event because the buyer account is not storing digital data about a second buyer account that is already involved in a sourcing event for the same commodity or a similar commodity. By creating multiple sourcing events for the same or similar goods or services, buyer computers use excessive amounts of the resources noted above.

Therefore, there is a need to improve identification of relevant sourcing events to decrease the excessive use of computer processing resources and network bandwidth. The foregoing and other objectives, features, and advantages of the invention will be more readily understood upon consideration of the following detailed description of the invention, taken in conjunction with the accompanying drawings.

SUMMARY

The appended claims may serve as a summary of the invention:

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 illustrates a networked computer system, in an example embodiment.

FIG. 5 depicts a portion of a computer screen display depicting a graphical user interface, in an example embodiment.

FIG. 6 depicts a portion of a computer screen display depicting a graphical user interface, in an example embodiment.

DETAILED DESCRIPTION

Figure 2A:
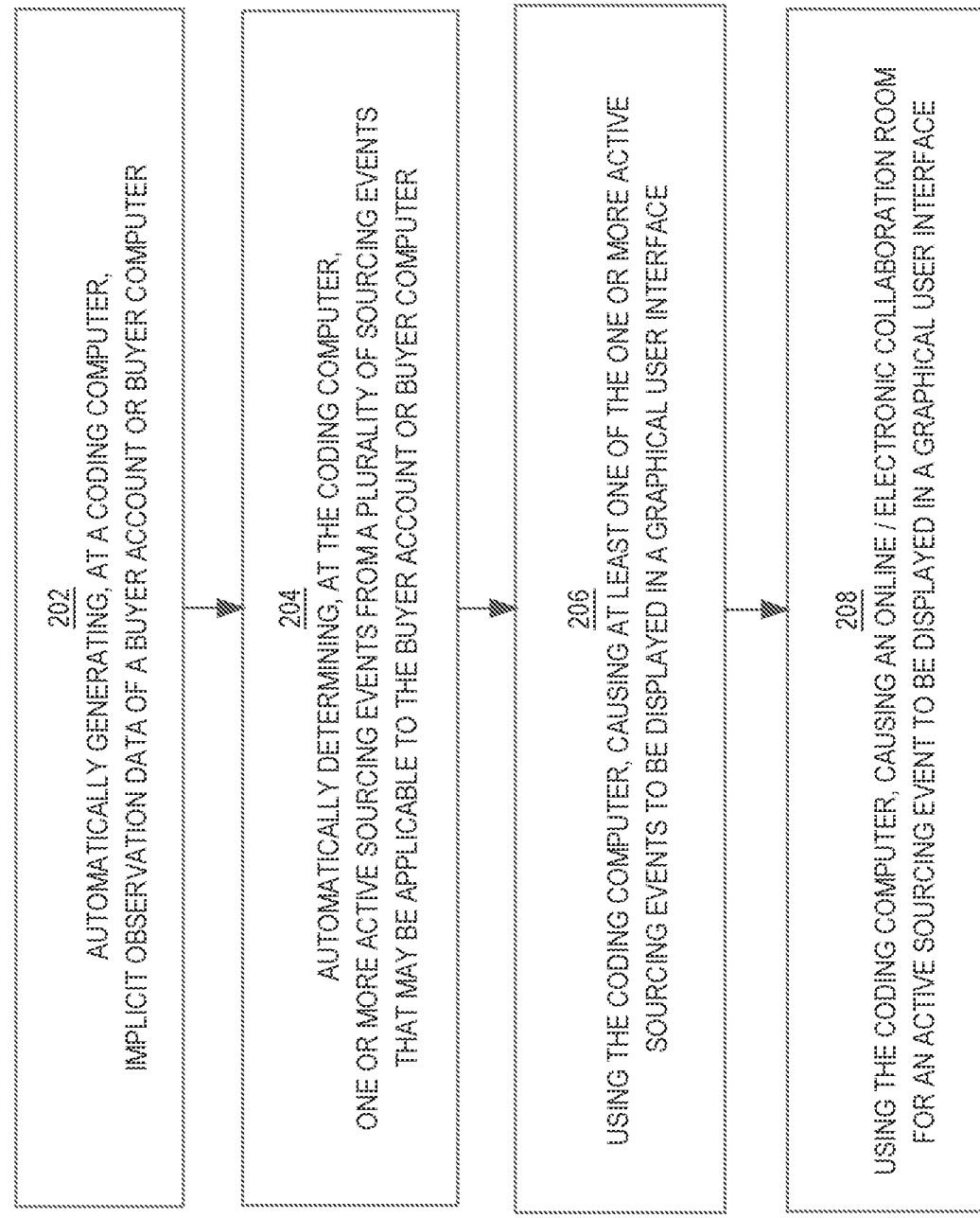
FIG. 2A illustrates an algorithm or method for recommending community sourcing events, in an example embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Embodiments are described in sections according to the following outline:

1.0 GENERAL OVERVIEW
2.0 STRUCTURAL OVERVIEW
3.0 PROCEDURAL OVERVIEW 4.0 GRAPHICAL USER INTERFACE IMPLEMENTATIONS
5.0 HARDWARE OVERVIEW
6.0 OTHER ASPECTS OF DISCLOSURE

1.0 General Overview

Computer-implemented techniques are disclosed for automatically identifying multi-party, community sourcing events that may be applicable or relevant to buyer accounts associated with buyer enterprises but without explicit buyer requests for recommendations. In some embodiments, applicable sourcing events are identified by using implicit observation data. Implicit observation data may be generated from context data, historical data, and/or assessment data that is digitally collected and stored in an e-procurement system as other transactions occur. Keywords or other digital attributes from the implicit observation data are cross-referenced or matched to sourcing event records to determine sourcing events that may be applicable to buyer accounts. In some cases, historic records of past, completed sourcing events may form a basis of recommending similar current sourcing events to buyer accounts. Buyer accounts may be connected to collaborate on sourcing specifics and to aggregate their spend for greater buying power in negotiations with supplier accounts.

In an embodiment, a computer-implemented method for improving efficiency in an electronic procurement system for sourcing resources comprises automatically generating, at a coding computer, implicit observation data of a buyer account or buyer computer. The method further comprises automatically determining, at the coding computer, one or more active sourcing events from a plurality of sourcing events, based on at least the implicit observation data of the buyer account or buyer computer. The method further comprises, using the coding computer, causing to display at least one of the one or more active sourcing events in a graphical user interface. In an embodiment, the method is performed during interactions of the buyer account or buyer computer with one or more software platforms and without receiving explicit request for recommendations from the buyer account or buyer computer.

All embodiments disclosed and claimed herein are directed to computer-implemented programmed processes that interact with digital data and perform calculations to cause transformations to other digital data and other ancillary technical effects. The disclosure is not intended to encompass techniques for organizing persons or for performing mental acts or steps, and any interpretation of the claims to encompass such techniques would be unreasonable based upon the disclosure as a whole. Embodiments address the technical problem of how to eliminate or reduce repeated or needless electronic communications that are otherwise required when searching for or creating community sourcing events. Specific problems of prior practice have included wasteful use of computer processing resources, such as CPU usage and memory, as well as network bandwidth. The solutions disclosed herein can improve identification of relevant sourcing events to decrease the excessive use of computer processing resources and network bandwidth. Consequently, the disclosed techniques provide numerous technical benefits. One example is reduced use of memory, CPU cycles, and other computer resources, resulting in improved machine efficiency, for all the reasons set forth herein. Further, while the disclosure provides for programmed, applied processes using computers, those processes are directed to improvements in another technical field of technology, namely e-procurement.

Other features, aspects and embodiments will become apparent from the disclosure as a whole including the drawings and claims.

2.0 Structural Overview

FIG. 1 is a block diagram of an example computer network system in which various embodiments may be practiced.

In an embodiment, a computer system 100 comprises components that are implemented at least partially by hardware at one or more computing devices, such as one or more hardware processors executing program instructions stored in one or more memories for performing the functions that are described herein. All functions described herein are intended to indicate operations that are performed using programming in a special-purpose computer or general-purpose computer, in various embodiments. A "computer" may be one or more physical computers, virtual computers, and/or computing devices. As an example, a computer may be one or more server computers, cloud-based computers, cloud-based cluster of computers, docker containers, virtual machine instances or virtual machine computing elements such as virtual processors, storage and memory, data centers, storage devices, desktop computers, laptop computers, mobile devices, and/or any other special-purpose computing devices. Any reference to "a computer" herein may mean one or more computers, unless expressly stated otherwise.

Computer executable instructions described herein may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. In another embodiment, the programmed instructions also may represent one or more files or projects of source code that are digitally stored in a mass storage device such as non-volatile RAM or disk storage, in the systems of FIG. 1 or a separate repository system, which when compiled or interpreted cause generating executable instructions which when executed cause the computer to perform the functions or operations that are described herein with reference to those instructions. In other words, the drawing figure may represent the manner in which programmers or software developers organize and arrange source code for later compilation into an executable, or interpretation into bytecode or the equivalent, for execution by computer(s).

FIG. 1 illustrates only one of many possible arrangements of components configured to execute the programming described herein. Other arrangements may include fewer or different components, and the division of work between the components may vary depending on the arrangement. In the example of FIG. 1, a networked computer system 100 may facilitate the exchange of data between server computer(s) 102, buyer computer(s) 112, and supplier computer(s) 116. Therefore, each of elements 102, 112, and 116 of FIG. 1 may represent one or more computers that host or execute stored programs that provide the functions and operations that are described further herein in connection with sourcing services, contracting services, and procurement services. The methods and systems describe herein may be designed to accommodate a variety of different enterprises.

In an embodiment, a networked computer system 100 comprises server computer(s) 102, buyer computer(s) 112, and supplier computer(s) 116, which are communicatively coupled directly or indirectly via network 114.

The server computer 102 may be implemented using a server-class computer or other computers having one or more processor cores, co-processors, or other computers. The server computer 102 may be a computer, software and/or hardware or a combination storing instructions that are programmed or configured to store, process, analyze, and send transaction data in order to generate recommendations. The server computer 102 may additionally receive information that is not specific to individual transactions, such as public contact information of suppliers, website URLs for suppliers, and catalogue information for suppliers.

In an embodiment, the server computer 102 executes, in association with a sourcing system, a contracting system, and a procurement system, sourcing event creation instructions 103, sourcing event searching instructions 104, sourcing event matchmaking instructions 105, tracking instructions 106, collaboration instructions 107, and display instructions 108, the functions of which are described elsewhere herein. Sourcing event creation instructions 103, sourcing event searching instructions 104, sourcing event matchmaking instructions 105, tracking instructions 106, collaboration instructions 107, and display instructions 108 may be computer instructions installed separately from or as a part of the sourcing system, contracting system, and/or the procurement system, as a module or a plug-in to supplement features of the sourcing system, contracting system, and/or the procurement system, as a separate instance of executing code on the server computer 102 than an instance of code of the sourcing system, contracting system, and/or the procurement system, or any other arrangement.

The sourcing event creation instructions 103 may cause the server computer 102 to receive, process, and save sourcing event creation data describing a sourcing event. In an embodiment, the sourcing event creation instructions 103 may cause receiving an input(s), via pull-down menu(s) and/or text field(s) of a graphical user interface (GUI), that indicate a type or category and additional information for a sourcing event that a buyer account or buyer computer wants to create. For example, the buyer account or buyer computer may provide input to select a type or category of sourcing event from a pull-down menu and provide an event title, event description, and other parameters, including but not limited to commodity, geography, and start and end dates in text fields, for a sourcing event that is being created. The sourcing event creation instructions 103 may also be configured to use the sourcing event creation data to generate or update and store a sourcing event record corresponding to the sourcing event. In an embodiment, a host of a sourcing event, as default, is the creator of the sourcing event but any participant of the sourcing event may become the host.

The sourcing event searching instructions 104 may cause the server computer 102 to receive and process search queries to find sourcing events. In an embodiment, the sourcing event searching instructions 104 may cause receiving an input(s), via pull-down menu(s) and/or text field(s) of a graphical user interface (GUI), that form a search query. For example, the buyer account or buyer computer may identify a commodity and select to view active or non-closed events, non-active or closed events, or all events, which may be sorted by date of event, size of event, or another criterion. The identified commodity may be used as a search term during a query.

In an embodiment, active or non-closed events include events that have either a Collecting Interest status or an In Progress status, and non-active or closed events are events that have a Complete status. In an embodiment, a Collecting Interest status indicates that a sourcing event has not progressed far enough to reach out to supplier accounts or supplier computers and additional time is needed to see whether more buyer accounts or buyer computers signal to participate in the sourcing event, whereas an In Progress status indicates that a sourcing event has progressed to a point where sufficient information have been collected from participating buyer accounts or buyer computers and spend volume data has been, is being, or will be soon shared with supplier accounts or supplier computers. In an embodiment, buyer accounts or buyer computers are only able to join sourcing events as long as the events remain active. A Complete status indicates that a sourcing event has concluded, expired, or canceled. In an embodiment, the status may be designated or updated by the host of the sourcing event, at any time, while the sourcing event remains active.

The sourcing event matchmaking instructions 105 may cause the server computer 102 to generate and process implicit observation data to determine active or non-closed sourcing events that may be applicable to buyer accounts or buyer computers. For example, the sourcing event matchmaking instructions 105 may cause the server computer 102 to automatically receive and evaluate context data to generate implicit observation data and to extract, or otherwise determine, keywords or attribute values from the data. Context data for a sourcing event may include date values, geo-location values such as country, state, region or other political or geographic unit, commodity, quantity, price range, industry or sector associated with buyer accounts or buyer computers, or items (goods and/or services) buyer accounts or buyer computers are sourcing.

Observation data may also be generated from historical data and assessment data. For example, observation data may be generated from past purchases, such as items (goods and/or services) that buyer accounts or buyer computers in an organization have purchased through a procurement system or have sourced in the past or contracted for in the past.

The sourcing event searching instructions 104 and/or sourcing event matchmaking instructions 105 may then cause the server computer 102 to cross-reference or match search terms and keywords to sourcing event records to determine active sourcing events that may be applicable to buyer accounts or buyer computers. Cross-referencing may comprise exact matching, fuzzy matching, multiple different queries with various wildcard substitution, a trained decision tree, or any other matching techniques. In an embodiment, any type of machine learning algorithm may be used as part of the sourcing event searching instructions 104 and/or the sourcing event matchmaking instructions 105.

The tracking instructions 106 may case the server computer 102 to track real-time actions or input signals of buyer accounts or buyer computers on one or more software platforms. For example, a buyer account or buyer computer may be creating a new sourcing event or may be interacting with a dashboard on the one or more software platforms. The tracking instructions 106 may also be configured to collect generate or context data from the tracking. In an embodiment, the tracking instructions 106 may track real-time actions or input signals of buyer accounts or buyer computers on a per session basis. In an embodiment, context data may only be used during the session in which the context data is collected. Alternatively, context data may be collected across a plurality of sessions and may be used in any one of the plurality of sessions.

The collaboration instructions 107 may cause the server computer 102 to generate an online or electronic collaboration room for each sourcing event record. In an embodiment, the collaboration room may include a message board feature, an email feature, or any other features that facilitate collaboration on sourcing specifics among participants of a sourcing event at one central place. In an embodiment, content added to the collaboration room may be optionally delivered or communicated, outside of the collaboration room, to participants via email, SMS, phone call, or another form of communication.

The display instructions 108 may cause the server computer 102, buyer computer 112, and/or supplier computer 116 to display content, such as recommended sourcing events that buyer accounts or buyer computers may participate in. In an embodiment, the display instructions 108 may cause the server computer 102 to automatically generate a panel showcasing the recommended sourcing events. The panel may be an overlay, displayed over the top of a working environment so as to not interrupt the working environment. Alternatively, the panel may be embedded within the environment, below an area which the buyer accounts or buyer computers had been interacting with, by moving existing content below that area further down to allow for insertion of the panel. Similarly, the panel may be embedded within the environment, above an area which the buyer accounts or buyer computers had been interacting with, by moving existing content above that area further up to allow for insertion of the panel. In this manner, the place of insertion into the environment informs the buyer accounts or buyer computers that the results are relevant to context of what the buyer accounts or buyer computers had been doing. The panel may be closed and removed from view.

Other sets of instructions may be included to form a complete system such as an operating system, utility libraries, a presentation layer, database interface layer and so forth.

The server computer 102 may be associated with database(s) 110. Database 110 may store sourcing event data, context data, historical data, assessment data, and implicit observation data. Database 110 is also programmed to store digital data for buyer accounts and seller accounts; in this context, an account is a discrete set of stored digital data that identifies a unique identify which may be a computer or other entity. Accounts are normally associated with access credentials such as username, password and/or two-factor authentication data, so that receiving correct access credentials is required for computer access to an account or to use an account to interact with other elements of FIG. 1.

Sourcing event data relate to all sourcing events, including non-active or closed sourcing events and active or non-closed sourcing events. For example, sourcing event data includes information regarding a host account or host computer, participant accounts or participant computers, communications between the participant accounts or participant computers, and other data pertaining to the sourcing event.

Implicit observation data may be generated from context data, historical data, or assessment data, and are data about buyer accounts or buyer computers that are observed by the server computer 102. Context data may relate to current or real-time actions or input signals of buyer accounts or buyer computers on one or more software platforms, such as click data associated with creating sourcing events, interacting with a real-time dashboard) or other actions in an e-procurement system. Historical data relate to historical spending of buyer accounts or buyer computers, such as previously purchased commodities and past amounts spent. Assessment data relate to risk scores of supplier accounts or supplier computers, existing negotiation agreements between buyer accounts or buyer computers on the one hand and supplier accounts or supplier computers on the other hand, and other information associated with transactions between buyer accounts or buyer computers and supplier accounts or supplier computers. Any combination of implicit observation data may be used to recommend active or non-closed sourcing events to buyer accounts or buyer computers.

In an embodiment, the server computer 102 may additionally store other data, such as supplier profiles that identify supplier accounts or supplier computers, contact information for the supplier accounts or supplier computers, win rate for the supplier accounts or supplier computers, past transactions of the supplier accounts or supplier computers, and categorization data that categories items associated supplier accounts or supplier computers. Additional computing elements, code or other functional elements that are not shown in FIG. 1 may be provided in association with the server computer 102.

Network 114 broadly represents a combination of one or more local area networks (LANs), wide area networks (WANs), metropolitan area networks (MANs), global interconnected internetworks, such as the public internet, or a combination thereof. Each such network may use or execute stored programs that implement internetworking protocols according to standards such as the Open Systems Interconnect (OSI) multi-layer networking model, including but not limited to Transmission Control Protocol (TCP) or User Datagram Protocol (UDP), Internet Protocol (IP), Hypertext Transfer Protocol (HTTP), and so forth. All computers described herein may be configured to connect to the network 114 and the disclosure presumes that all elements of FIG. 1 are communicatively coupled via network 114. The various elements depicted in FIG. 1 may also communicate with each other via direct communications links that are not depicted in FIG. 1 for purposes of explanation.

The server computer 102 is accessible over network 114 by multiple computing devices, such as a buyer computer 112 or a supplier computer 116. Any other number of buyer computers 112 or supplier computers 116 may be registered with the server computer 102 at any given time. Thus, the elements in FIG. 1 are intended to represent one workable embodiment but are not intended to constrain or limit the number of elements that could be used in other embodiments.

The computing devices such as the buyer computer 112 and supplier computer 116 may comprise a desktop computer, laptop computer, tablet computer, smartphone, or any other type of computing device that allows access to the server 102. The buyer computer 112 may be associated with one or more buyers. The supplier computer 116 may be associated with one or more suppliers.

3.0 Procedural Overview

FIG. 2A illustrates an algorithm or method for recommending community sourcing events, in an example embodiment. For purposes of illustrating a clear example, FIG. 2A is described herein in the context of FIG. 1, but the broad principles of FIG. 2A can be applied to other systems having configurations other than as shown in FIG. 1. Further, FIG. 2A illustrates an algorithm or plan that may be used as a basis for programming one or more of the functional modules of FIG. 1 that relate to the functions that are illustrated in the diagram, using a programming development environment or programming language that is deemed suitable for the task. Thus, FIG. 2A is intended as an illustration at the functional level at which skilled persons, in the art to which this disclosure pertains, communicate with one another to describe and implement algorithms using programming. The flow diagram is not intended to illustrate every instruction, method object or sub step that would be needed to program every aspect of a working program, but are provided at the high, functional level of illustration that is normally used at the high level of skill in this art to communicate the basis of developing working programs.

The example algorithm or method 200 of FIG. 2A begins with step 202. At step 202, a coding computer automatically generates implicit observation data of a buyer account or buyer computer. Implicit observation data of the buyer account or buyer computer may be data about the buyer account or buyer computer that is observed by the server computer 102. Implicit observation data may be generated from context data relating to real-time actions or input signals of the buyer account or buyer computer on one or more software platforms. The coding computer may be, for example, the server computer 102 and real-time actions or input signals may be digital electronic input such as mouse clicks, other input from a pointing device, keyboard input or other signals or data specifying a buyer computer 112 executing any of: navigating to a page in an e-procurement system; selecting a commodity type when creating a new sourcing event; selecting a commodity category when creating a new sourcing event; interacting with a dashboard(s) relating to a commodity.

In an embodiment, the coding computer tracks real-time actions or input signals of the buyer account or buyer computer on the one or more software platforms and obtains context data from the tracking. Context data relate to the real-time input signals of the buyer account or buyer computer on the one or more software platforms.

In an embodiment, once the server computer generates the observation data, the server computer 102 may process the observation data to extract, or otherwise determine, one or more keywords therefrom. At step 204, the coding computer automatically determines one or more active sourcing events from a plurality of sourcing events that may be applicable to the buyer account or buyer computer.

To determine applicable active sourcing events, the server computer 102 may use matching algorithms and techniques to cross-reference the one or more keywords from the implicit observation data of the buyer account or buyer computer to sourcing event records, corresponding to the plurality of sourcing events, that are stored in database 110. For example, the one or more keywords may comprise a commodity term that the server computer 102 uses to cross-reference with sourcing events records of sourcing events that are not yet closed. For yet another example, the one or more keywords may comprise an item term that the server computer 102 uses to cross-reference with source event records of sourcing events that are not yet closed.

Cross-referencing may include exact matching, fuzzy matching, multiple different queries with various wildcard substitution, a trained decision tree, or any other matching techniques. In an embodiment, any type of machine learning algorithm may be used to cross-reference the implicit observation data to the sourcing event records in order to automatically determine the one or more active sourcing events that may be applicable to the buyer account or buyer computer. For example, the implicit observation data may be provided as input to a trained classifier implemented using Google TensorFlow to yield output specifying one or more features of sourcing events that are most relevant to the implicit observation data. In an embodiment, an applicable sourcing event may be an event that is relevant to what the buyer account or buyer computer is currently executing using the one or more software platforms.

If a sourcing event record features a matching title, description (e.g., describing items in an event), or commodity type, then the server computer 102 may also use other information, such as geography, in the sourcing event record to determine whether the corresponding sourcing event is not only applicable but is also a good match for the buyer account or buyer computer. In an embodiment, a sourcing event is a good match if it is more likely than not that the buyer account or buyer computer will join or participate in the sourcing event.

At step 206, the coding computer causes at least one of the one or more active sourcing events to be displayed in a GUI. For example, once the one or more active sourcing events are determined using the observation data at step 204, the server computer 102 may cause at least one of the one or more active sourcing events, organized in a particular manner (such as by date of creation), to be displayed in GUI at the server computer 102, the buyer computer 112, and/or the supplier computer 116.

In an embodiment, the at least one of the one or more active sourcing events may be showcased in a distinct graphical panel of the GUI or transmitted as part of a notification, alert or other message, including in messages to other computers. The panel may be an overlay, displayed over the top of a working environment so as to not interrupt the working environment. Alternatively, the panel may be embedded within the environment, below an area which the buyer account or buyer computer had been interacting with, by moving existing content below that area further down to allow for insertion of the panel. Similarly, the panel may be embedded within the environment, above an area which the buyer account or buyer computer had been interacting with, by moving existing content above that area further up to allow for insertion of the panel.

Figure 2B:
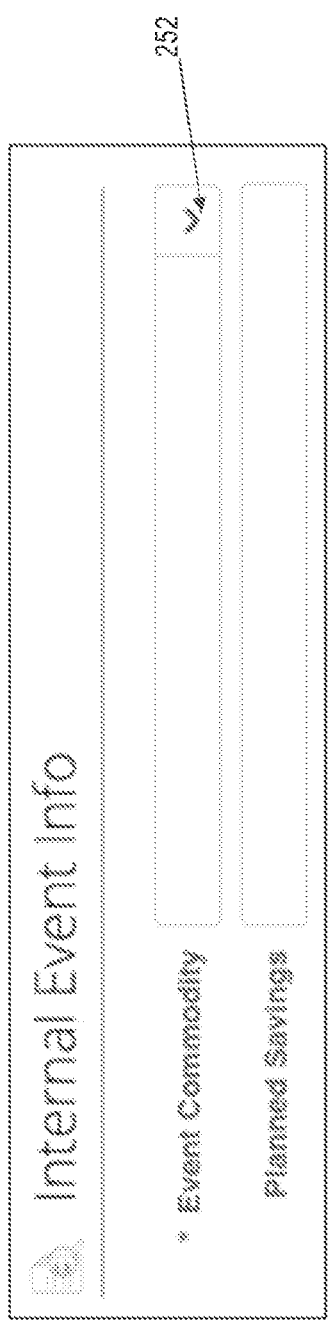
FIG. 2B depicts a portion of a computer screen display depicting a graphical user interface, in an example embodiment.
Figure 2C:
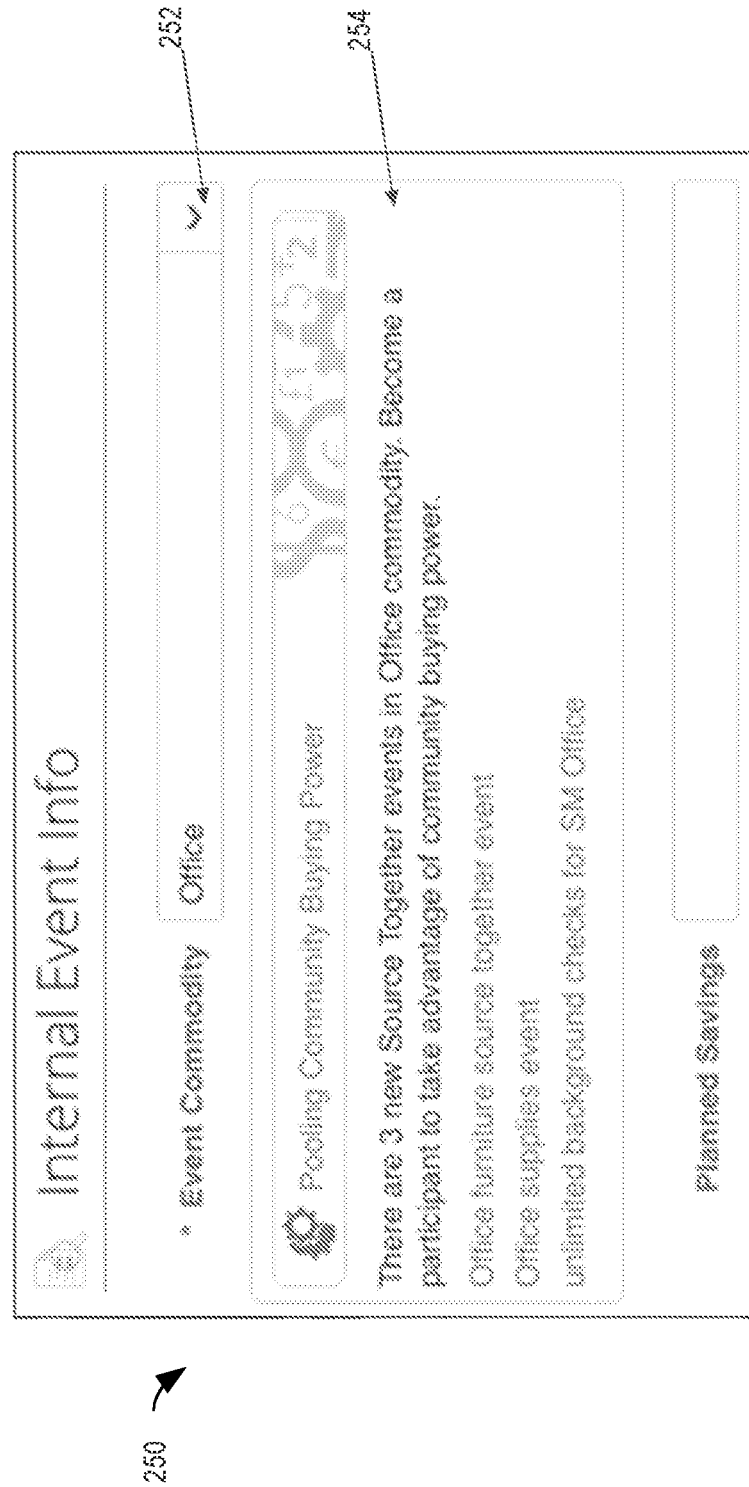
FIG. 2C depicts a portion of a computer screen display depicting a graphical user interface, in an example embodiment.

In this manner, the place of insertion into the environment informs the buyer account or buyer computer that the results are relevant to context of what the buyer account or buyer computer had been doing. FIG. 2B and FIG. 2C illustrate an example of panel insertion, according to an embodiment. FIG. 2B and FIG. 2C are further discussed elsewhere herein.

The buyer account or buyer computer may view or receive input for any of the displayed sourcing events to review the event description, to query or retrieve a listing of current participants, and to transmit messages to request participation in the sourcing event.

In an embodiment, when a buyer account or buyer computer requests participation in a sourcing event, the buyer account or buyer computer may be prompted to provide initial information which is submitted to the host of the sourcing event. The initial information may include the nature of the interest of the buyer account or buyer computer and may be used by the host to approve or disapprove the request to join the sourcing event.

At step 208, the coding computer causes an online or electronic collaboration room for an active sourcing event to be displayed in a GUI. For example, once the host of the sourcing event has approved the request to join the sourcing event, the server computer 102 may cause the collaboration room associated with the sourcing event to be displayed in GUI at the server computer 102, the buyer computer 112, and/or the supplier computer 116.

In an embodiment, the collaboration room is a central location for collaboration around the sourcing event. After joining the sourcing event, the buyer account or buyer computer is categorized or labeled in digital data as a participant of the sourcing event and is granted authorization to access or view a greater amount of data relating to details of the sourcing event. The buyer account or buyer computer is able to exchange directly with accounts or computers or other event participants and collaborate on sourcing specifics.

The host of the sourcing event may update the status of the sourcing event from Collecting Interest to In Progress or from In Progress to Complete at any time during the pendency of the sourcing event. In an embodiment, a Collecting Interest status indicates that a sourcing event has not progressed far enough to reach out to supplier accounts or supplier computers and additional time is needed to see whether more buyer accounts or buyer computers are interested in participating in the sourcing event, whereas an In Progress status indicates that a sourcing event has progressed to a point where sufficient information have been collected from participating buyer accounts or buyer computers and spend volume data has been, is being, or will be soon shared with supplier accounts or supplier computers. A Complete status indicates that a sourcing event has concluded, expired, or canceled.

During the in progress stage, a sourcing service may be utilized that allows the host to negotiate with supplier accounts or supplier computers on behalf of the participants. The host is able to, via the collaboration room, communicate back to the buyer account or buyer computer once a supplier has been selected or has won. A contracting service may be utilized to complete contracts between the selected supplier and each of the participants. A procurement service may be utilized to complete transactions.

In an embodiment, the method 200 of FIG. 2A is performed during digital electronic interactions of a buyer account or buyer computer with the one or more software platforms and without receiving explicit requests for recommendations from the buyer account or buyer computer. For example, a buyer account or buyer computer denoted "Buyer A" is creating a new sourcing event under the "IT hardware" category. During this time and without Buyer A requesting for recommendations, three active sourcing events relating to IT hardware are automatically recommended to Buyer A based on the context of what Buyer A is doing (creating a new sourcing event for IT hardware). The three recommended active sourcing events had been automatically identified because they all relate to IT hardware. Buyer A may join a recommended sourcing event and may thereafter collaborate with other accounts or computers on sourcing specifics in a collaboration room associated with the sourcing event.

In an embodiment, the coding computer may also generate and process implicit observation data of a buyer account or buyer computer from other information associated with the buyer account or buyer computer, to automatically identify active sourcing events that may be applicable to the buyer account or buyer computer and push this information to the buyer account or buyer computer.

For example, the coding computer may use historical data of a buyer account or buyer computer to generate implicit observation data. Historical data of the buyer account or buyer computer relates to or specifies historical spending of the buyer account or buyer computer in other transactions, such as previously purchased commodities and past amounts spent. As an illustration, the coding computer may determine that the buyer account or buyer computer had previously purchased printer paper through a past sourcing event and, in response, recommends printer toner sourcing events to the buyer account or buyer computer as the buyer account or buyer computer may be interested in printer toner sourcing events.

For another example, the coding computer may use assessment data of a buyer account or buyer computer to generate implicit observation data. Assessment data of the buyer account or buyer computer relates to supplier risk scores, existing negotiation agreements between the buyer account or buyer computer and those of supplier accounts or supplier computers, and other information associated with buyer-supplier relationships. As an illustration, the coding computer may determine that an existing contract between the buyer account or buyer computer and a supplier account or supplier computer for a commodity, such as printer paper, will be expiring soon and, in response, recommends printer paper sourcing events to the buyer account or buyer computer because it has been determined that the buyer account or buyer computer may need to enter into another contract for more printer paper. As another illustration, the coding computer may determine that a printer paper supplier account or supplier computer that the buyer account or buyer computer is in an existing contract with, has filed for bankruptcy or has a risk score that has gone into a red state and, in response, recommends printer paper sourcing events to the buyer account or buyer computer because it has been determined that the buyer account or buyer computer may need to enter into contract with another supplier account or supplier computer.

4.0 Graphical User Interface Implementations

FIG. 2B depicts a portion of a computer screen display depicting a GUI 250 featuring an initial inquiry as to a category or type of event commodity 252 for which a new sourcing event will be created under.

FIG. 2C depicts the GUI 250 of FIG. 2B, after the category or type 252 has been selected by a buyer account or buyer computer. In the example illustrated in FIG. 2C, the Office category has been selected. In response to the selection, a panel 254 is embedded within the environment 250, below the area 252, by moving existing content below that area 252 further down to allow for insertion of the panel 254. In this manner, the place of insertion into the environment 250 informs the buyer account or buyer computer that the results showcased in the panel 254 are relevant to context of then-current actions executed by the buyer account or buyer computer.

Figure 3:
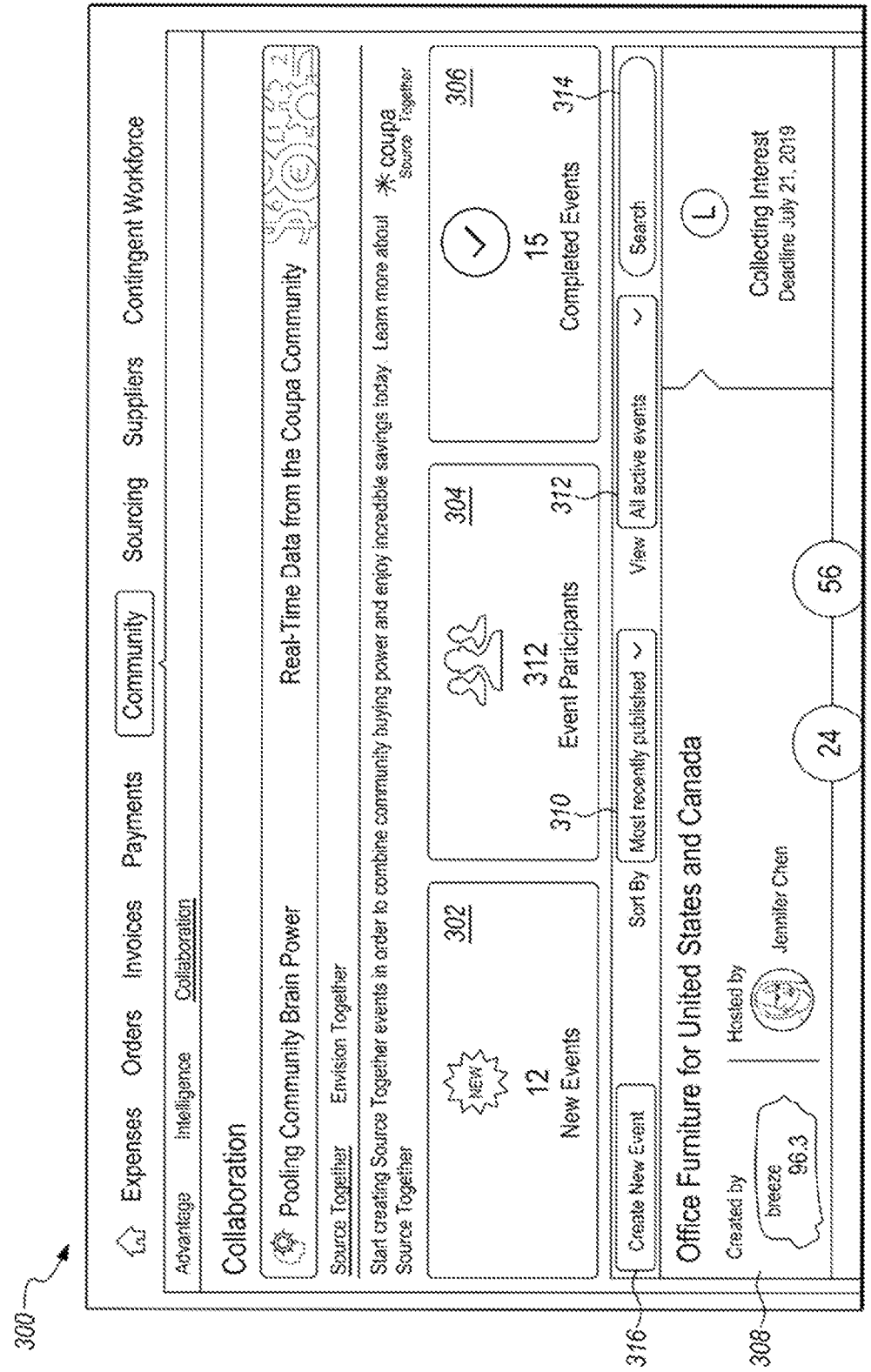
FIG. 3 depicts a portion of a computer screen display depicting a graphical user interface, in an example embodiment.

FIG. 3 depicts a portion of a computer screen display depicting a GUI 300 featuring a summary area including New Events section 302, an Event Participants section 304, and a Completed Events section 306. The New Events section 302 includes a number of new events that have been recently added, the Events Participants section 304 includes a number of event participants across all active or non-closed events, and the Completed Events section 306 includes a number of events that are non-active or closed. Below the summary area, a list of sourcing events 308 is featured, although only one is shown in FIG. 3. The listed sourcing events can be organized according to a selected sort preference 310 and can include or exclude particular sourcing events according to a selected view filter 312. For example, the sourcing events listed in FIG. 3 include only those that are active and are sorted based on most recently published. The listed source events can also be a result of an explicit search based on an entered search term(s) in field 314. A new sourcing event can be created by activating a Create button or link 316 from the GUI 300.

Figure 4:
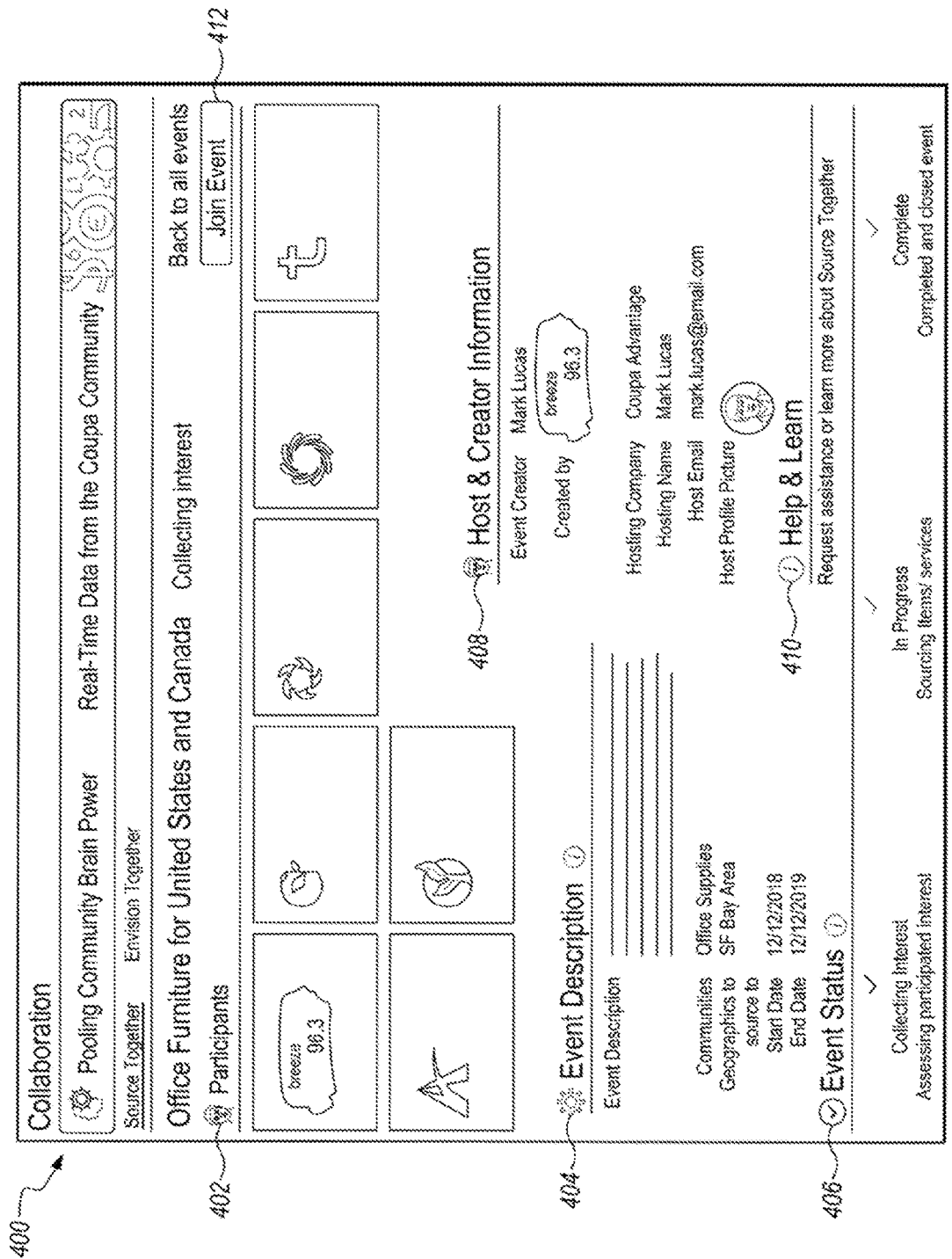
FIG. 4 depicts a portion of a computer screen display depicting a graphical user interface, in an example embodiment.

FIG. 4 depicts a portion of a computer screen display depicting a GUI 400 featuring information related to a sourcing event. A Participants section 402 lists current participants. An Event Description 404 provides information about the sourcing event. An Event Status 406 indicates the current status of the sourcing event. A Host & Creator Information section 408 provides information about the host and creator of the sourcing event. A Help & Learn section 410 enables a buyer account or buyer computer to obtain more information prior to participating or joining in the sourcing event. A buyer account or buyer computer may request to join the sourcing event via a Join button or link 412 from the GUI 400.

Figure 5:
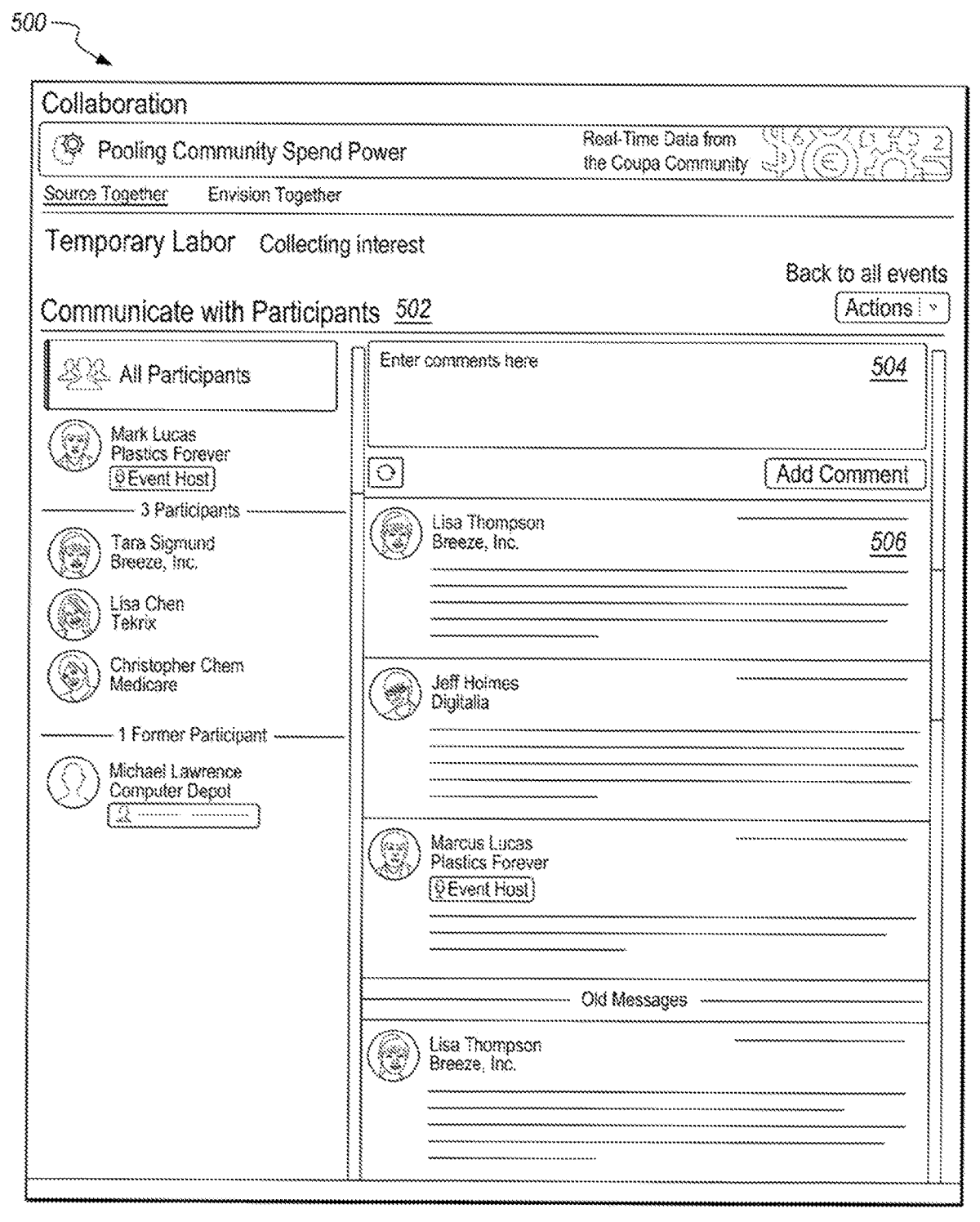

FIG. 5 depicts a portion of a computer screen display depicting a GUI 500 featuring an online or electronic collaboration room for a sourcing event. The collaboration room includes a Communicate with Participants area. The Communicate with Participants area includes an All Participants section 502 that lists all current and former participants. In an embodiment, the host of the sourcing event is listed first among all listed participants. The Communicate with Participants area also includes a message board feature comprising a text box 504 and a listing of messages 506 that are chronologically ordered. The message board feature allows for participants to collaborate on sourcing specifics. The message board feature may also allow for file attachments and direct communication with any one of the participants. Although not illustrated in FIG. 5, the GUI 500 may also feature a Description area providing information about the sourcing event.

FIG. 6 depicts a portion of a computer screen display depicting a GUI 600 to create a new sourcing event. Information about the sourcing event may be input in an Event Settings section 602 and Event Status section 604. For example, text fields are provided for an event name, an event description, commodities, geography, and start and end dates. Basic information about the host or creator of the event may be automatically generated in a Your Information section 606, although additional information may be input.

Using the foregoing techniques, programmed computers may use a distributed system to generate, store, monitor, and apply implicit observation data to automatically determine sourcing events that may be applicable to buyers, without buyers explicitly requesting for recommendations. Implicit observation data are data about buyers that are "observed" or "learned" by the server computer. Implicit observation data may be generated from context data, historical data, and/or assessment data. Context data relate to current or real-time buyer actions or input signals on one or more software platforms. Historical data relate to historical spending of buyers, such as previously purchased commodities and past amounts spent. Assessment data relate to supplier risk scores, existing negotiation agreements between buyers and suppliers, and other information associated with buyer-supplier relationships. Previous approaches involved explicitly searching for sourcing events and creating redundant sourcing events when no relevant query results are found, resulting in excessive and wasteful use of processing resources such as CPU cycles, memory, and network bandwidth. However, the present approach uses machine learning in association with implicit observation data to result in use of fewer computational resources including fewer network messages, less memory and fewer CPU cycles, for all the reasons set forth in the preceding paragraphs.

5.0 Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 7:
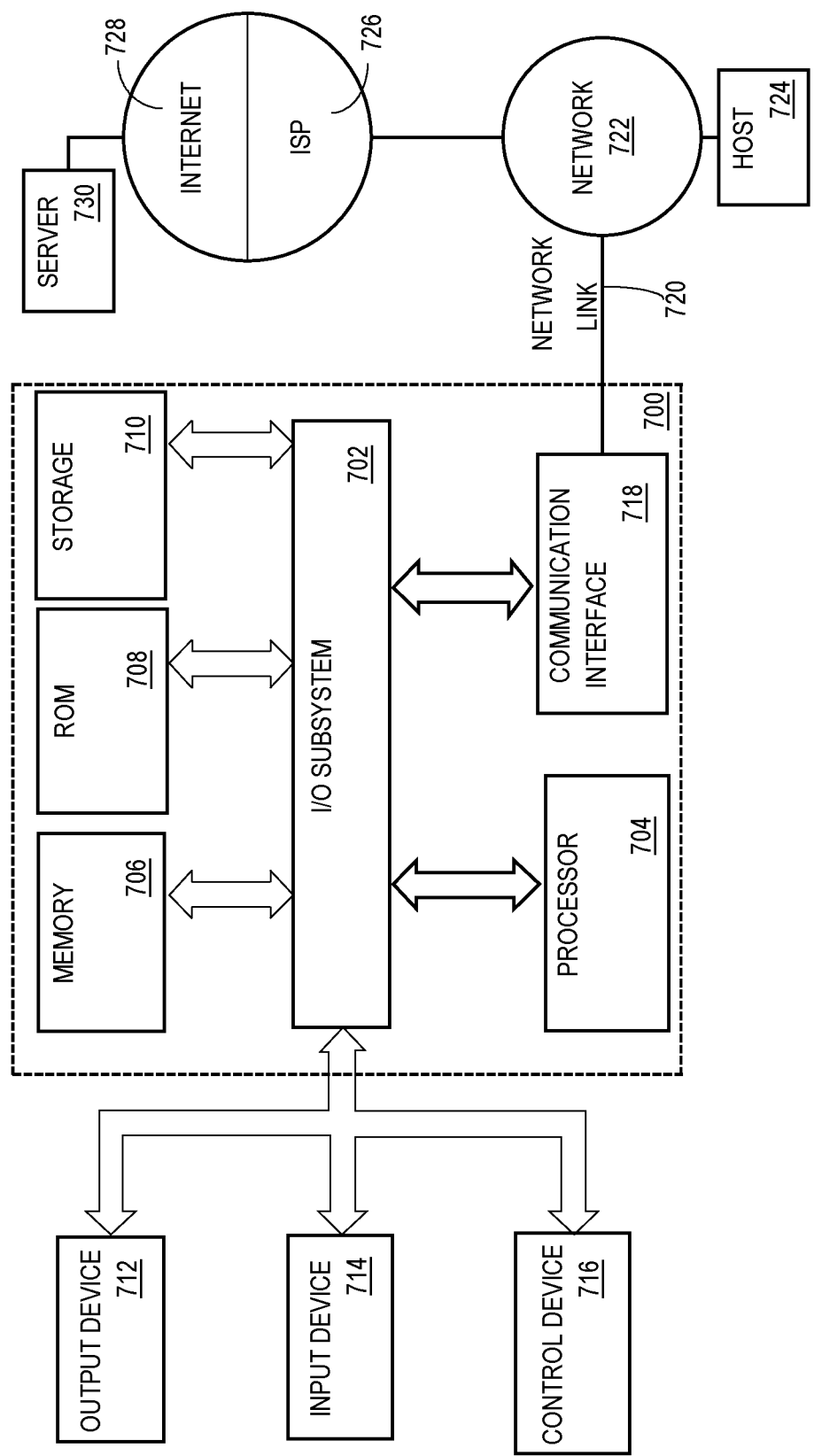
FIG. 7 is a block diagram that illustrates a computer system upon which an embodiment of the invention may be implemented.

FIG. 7 is a block diagram that illustrates an example computer system with which an embodiment may be implemented. In the example of FIG. 7, a computer system 700 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 700 includes an input/output (I/O) subsystem 702 which may include a bus and/or other communication mechanism(s) for communicating information and/or instructions between the components of the computer system 700 over electronic signal paths. The I/O subsystem 702 may include an I/O controller, a memory controller and at least one I/O port. The electronic signal paths are represented schematically in the drawings, for example as lines, unidirectional arrows, or bidirectional arrows.

At least one hardware processor 704 is coupled to I/O subsystem 702 for processing information and instructions. Hardware processor 704 may include, for example, a general-purpose microprocessor or microcontroller and/or a special-purpose microprocessor such as an embedded system or a graphics processing unit (GPU) or a digital signal processor or ARM processor. Processor 704 may comprise an integrated arithmetic logic unit (ALU) or may be coupled to a separate ALU.

Computer system 700 includes one or more units of memory 706, such as a main memory, which is coupled to I/O subsystem 702 for electronically digitally storing data and instructions to be executed by processor 704. Memory 706 may include volatile memory such as various forms of random-access memory (RAM) or other dynamic storage device. Memory 706 also may be used for storing temporary variables or other intermediate information during execution of instructions to be executed by processor 704. Such instructions, when stored in non-transitory computer-readable storage media accessible to processor 704, can render computer system 700 into a special-purpose machine that is customized to perform the operations specified in the instructions.

Computer system 700 further includes non-volatile memory such as read only memory (ROM) 708 or other static storage device coupled to I/O subsystem 702 for storing information and instructions for processor 704. The ROM 708 may include various forms of programmable ROM (PROM) such as erasable PROM (EPROM) or electrically erasable PROM (EEPROM). A unit of persistent storage 710 may include various forms of non-volatile RAM (NVRAM), such as FLASH memory, or solid-state storage, magnetic disk or optical disk such as CD-ROM or DVD-ROM, and may be coupled to I/O subsystem 702 for storing information and instructions. Storage 710 is an example of a non-transitory computer-readable medium that may be used to store instructions and data which when executed by the processor 704 cause performing computer-implemented methods to execute the techniques herein.

The instructions in memory 706, ROM 708 or storage 710 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 700 may be coupled via I/O subsystem 702 to at least one output device 712. In one embodiment, output device 712 is a digital computer display. Examples of a display that may be used in various embodiments include a touch screen display or a light-emitting diode (LED) display or a liquid crystal display (LCD) or an e-paper display. Computer system 700 may include other type(s) of output devices 712, alternatively or in addition to a display device. Examples of other output devices 712 include printers, ticket printers, plotters, projectors, sound cards or video cards, speakers, buzzers or piezoelectric devices or other audible devices, lamps or LED or LCD indicators, haptic devices, actuators or servos.

At least one input device 714 is coupled to I/O subsystem 702 for communicating signals, data, command selections or gestures to processor 704. Examples of input devices 714 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (INU) sensors and/or various types of transceivers such as wireless, such as cellular or Wi-Fi, radio frequency (RF) or infrared (IR) transceivers and Global Positioning System (GPS) transceivers.

Another type of input device is a control device 716, which may perform cursor control or other automated control functions such as navigation in a graphical interface on a display screen, alternatively or in addition to input functions. Control device 716 may be a touchpad, a mouse, a trackball, or cursor direction keys for communicating direction information and command selections to processor 704 and for controlling cursor movement on display 712. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 714 may include a combination of multiple different input devices, such as a video camera and a depth sensor.

In another embodiment, computer system 700 may comprise an internet of things (IoT) device in which one or more of the output device 712, input device 714, and control device 716 are omitted. Or, in such an embodiment, the input device 714 may comprise one or more cameras, motion detectors, thermometers, microphones, seismic detectors, other sensors or detectors, measurement devices or encoders and the output device 712 may comprise a special-purpose display such as a single-line LED or LCD display, one or more indicators, a display panel, a meter, a valve, a solenoid, an actuator or a servo.

When computer system 700 is a mobile computing device, input device 714 may comprise a global positioning system (GPS) receiver coupled to a GPS module that is capable of triangulating to a plurality of GPS satellites, determining and generating geo-location or position data such as latitude-longitude values for a geophysical location of the computer system 700. Output device 712 may include hardware, software, firmware and interfaces for generating position reporting packets, notifications, pulse or heartbeat signals, or other recurring data transmissions that specify a position of the computer system 700, alone or in combination with other application-specific data, directed toward host 724 or server 730.

Computer system 700 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 700 in response to processor 704 executing at least one sequence of at least one instruction contained in main memory 706. Such instructions may be read into main memory 706 from another storage medium, such as storage 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 710. Volatile media includes dynamic memory, such as memory 706. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 702. Transmission media can also take the form of acoustic or light waves, such as those generated during radio-wave and infra-red data communications.

Various forms of media may be involved in carrying at least one sequence of at least one instruction to processor 704 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 700 can receive the data on the communication link and convert the data to a format that can be read by computer system 700. For instance, a receiver such as a radio frequency antenna or an infrared detector can receive the data carried in a wireless or optical signal and appropriate circuitry can provide the data to I/O subsystem 702 such as place the data on a bus. I/O subsystem 702 carries the data to memory 706, from which processor 704 retrieves and executes the instructions. The instructions received by memory 706 may optionally be stored on storage 710 either before or after execution by processor 704.

Computer system 700 also includes a communication interface 718 coupled to bus 702. Communication interface 718 provides a two-way data communication coupling to network link(s) 720 that are directly or indirectly connected to at least one communication networks, such as a network 722 or a public or private cloud on the Internet. For example, communication interface 718 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 722 broadly represents a local area network (LAN), wide-area network (WAN), campus network, internetwork or any combination thereof. Communication interface 718 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 718 sends and receives electrical, electromagnetic or optical signals over signal paths that carry digital data streams representing various types of information.

Network link 720 typically provides electrical, electromagnetic, or optical data communication directly or through at least one network to other data devices, using, for example, satellite, cellular, Wi-Fi, or BLUETOOTH technology. For example, network link 720 may provide a connection through a network 722 to a host computer 724.

Furthermore, network link 720 may provide a connection through network 722 or to other computing devices via internetworking devices and/or computers that are operated by an Internet Service Provider (ISP) 726. ISP 726 provides data communication services through a world-wide packet data communication network represented as internet 728. A server computer 730 may be coupled to internet 728. Server 730 broadly represents any computer, data center, virtual machine or virtual computing instance with or without a hypervisor, or computer executing a containerized program system such as DOCKER or KUBERNETES. Server 730 may represent an electronic digital service that is implemented using more than one computer or instance and that is accessed and used by transmitting web services requests, uniform resource locator (URL) strings with parameters in HTTP payloads, API calls, app services calls, or other service calls. Computer system 700 and server 730 may form elements of a distributed computing system that includes other computers, a processing cluster, server farm or other organization of computers that cooperate to perform tasks or execute applications or services. Server 730 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 730 may comprise a web application server that hosts a presentation layer, application layer and data storage layer such as a relational database system using structured query language (SQL) or no SQL, an object store, a graph database, a flat file system or other data storage.

Computer system 700 can send messages and receive data and instructions, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, and/or stored in storage 710, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 704. While each processor 704 or core of the processor executes a single task at a time, computer system 700 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

6.0 Other Aspects of Disclosure

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps.

Various operations have been described using flowcharts. In certain cases, the functionality/processing of a given flowchart step may be performed in different ways to that described and/or by different systems or system modules. Furthermore, in some cases a given operation depicted by a flowchart may be divided into multiple operations and/or multiple flowchart operations may be combined into a single operation. Furthermore, in certain cases the order of operations as depicted in a flowchart and described may be able to be changed without departing from the scope of the present disclosure.

It will be understood that the embodiments disclosed and defined in this specification extends to all alternative combinations of two or more of the individual features mentioned or evident from the text or drawings. All of these different combinations constitute various alternative aspects of the embodiments.

What is claimed is:

1. A computer-implemented method for improving efficiency in an electronic procurement system for sourcing resources, the method comprising:

during digital electronic interactions of a buyer computer with one or more software platforms and without receiving an explicit request for recommendations from the buyer computer:

automatically tracking real-time digital electronic actions of the buyer computer on the one or more software platforms;

automatically generating, at a coding computer, implicit observation data of the buyer computer from context data of the buyer computer, the context data of the buyer computer relating to the real-time digital electronic actions of the buyer computer on the one or more software platforms;

processing the implicit observation data to extract one or more keywords;

determining that the one or more keywords comprise a commodity term;

cross-referencing, using a trained machine-learning classifier, the commodity term to a plurality of sourcing event records corresponding to a plurality of active sourcing events that are not yet closed and in which a plurality of buyer computers can participate;

automatically determining, at the coding computer, one or more active sourcing events from the plurality of active sourcing events, based on at least the implicit observation data of the buyer computer;

generating, using the coding computer, one or more electronic collaboration rooms for each of the one or more active sourcing events;

displaying, using the coding computer, the one or more electronic collaboration rooms in a graphical user interface (GUI) of the buyer computer, each of the one or more electronic collaboration rooms comprising a message board to communicate with one or more participants of a respective active sourcing event;

updating, using the coding computer, a status of the respective active sourcing event in a corresponding electronic collaboration room in the GUI of the buyer computer from a first status indicator to a second status indicator, wherein the first status indicator represents a status that one or more supplier computers is required to participate in the respective active sourcing event with the buyer computer, wherein the second status indicator represents a status that the respective active sourcing event has progressed to have sufficient information collected from the buyer computer to share with the one or more supplier computers in the respective active sourcing event.

2. The method of claim 1, further comprising: in response to the buyer computer transmitting a message to request participation in a particular sourcing event among the one or more active sourcing events that are displayed in a graphical panel, causing a particular electronic collaboration room for the particular sourcing event to be displayed in the GUI; granting authorization to the buyer computer to access a particular message board associated with the particular electronic collaboration room to communicate with one or more participants of the particular sourcing event.

3. The method of claim 1, wherein the real-time digital electronic actions of the buyer computer include creating a new sourcing event through a graphical panel in the GUI of the buyer computer.

4. The method of claim 3, further comprising:
   displaying, using the coding computer, a new events section in the graphical panel of the GUI of the buyer computer for accessing the new sourcing event;
   searching for a sourcing event to participate in the graphical panel of the GUI of the buyer computer.

5. The method of claim 1, further comprising automatically generating the implicit observation data of the buyer computer from historical data of the buyer computer, wherein the historical data of the buyer computer specifies historical spending of the buyer computer in other transactions.

6. The method of claim 1, further comprising automatically generating the implicit observation data of the buyer computer from assessment data of the buyer computer, wherein the assessment data of the buyer computer relates to current relationships with supplier computers.

7. The method of claim 1, wherein the tracking of the real-time digital electronic actions of the buyer computer on the one or more software platforms is during a single session, and the method further comprises:
   in response to performing the tracking, obtaining the context data of the buyer computer based on the tracking, wherein the context data of the buyer computer relates to the real-time digital electronic actions of the buyer computer on the one or more software platforms.

8. One or more non-transitory computer-readable media storing one or more sequences of instructions which, when executed using one or more processors, cause the one or more processors to perform:
   during digital electronic interactions of a buyer computer with one or more software platforms and without receiving an explicit request for recommendations from the buyer computer,
      automatically tracking real-time digital electronic actions of the buyer computer on the one or more software platforms;
      automatically generating, at a coding computer, implicit observation data of the buyer computer from context data of the buyer computer, the context data of the buyer computer relating to the real-time digital electronic actions of the buyer computer on the one or more software platforms;
      processing the implicit observation data to extract one or more keywords;
      determining that the one or more keywords comprise a commodity term; and
      cross-referencing, using a trained machine-learning classifier, the commodity term to a plurality of sourcing event records corresponding to a plurality of active sourcing events that are not yet closed and in which a plurality of buyer computers can participate;
      automatically determining, at the coding computer, one or more active sourcing events from the plurality of active sourcing events, based on at least the implicit observation data of the buyer computer;
      generating, using the coding computer, one or more electronic collaboration rooms for each of the one or more active sourcing events;
      displaying, using the coding computer, the one or more electronic collaboration rooms in a GUI of the buyer computer, each of the one or more electronic collaboration rooms comprising a message board to communicate with one or more participants of a respective active sourcing event;
      updating, using the coding computer, a status of the respective active sourcing event in a corresponding electronic collaboration room in the GUI of the buyer computer from a first status indicator to a second status indicator, wherein the first status indicator represents a status that one or more supplier computers is required to participate in the respective active sourcing event with the buyer computer, wherein the second status indicator represents a status that the respective active sourcing event has progressed to have sufficient information collected from the buyer computer to share with the one or more supplier computers in the respective active sourcing event.

9. The one or more non-transitory computer-readable media of claim 8, further comprising sequences of instructions which, when executed using the one or more processors, cause the one or more processors to perform: in response to the buyer computer transmitting a message to request participation in a particular sourcing event among the one or more active sourcing events that are displayed in a graphical panel, causing a particular electronic collaboration room for the particular sourcing event to be displayed in the GUI; and granting authorization to the buyer computer to access a particular message board associated with the particular electronic collaboration room to communicate with one or more participants of the particular sourcing event.

10. The one or more non-transitory computer-readable media of claim 8, wherein the real-time digital electronic actions of the buyer computer include creating a new sourcing event through a graphical panel in the GUI of the buyer computer.

11. The one or more non-transitory computer-readable media of claim 10, further comprising sequences of instructions which, when executed using the one or more processors, cause the one or more processors to perform: displaying, using the coding computer, a new events section in the graphical panel of the GUI of the buyer computer for accessing the new sourcing event; searching for a sourcing event to participate in the graphical panel of the GUI of the buyer computer.

12. The one or more non-transitory computer-readable media of claim 8, further comprising sequences of instructions which, when executed using the one or more processors, cause the one or more processors to perform: automatically generating the implicit observation data of the buyer computer from historical data of the buyer computer, wherein the historical data of the buyer computer specifies historical spending of the buyer computer in other transactions.

13. The one or more non-transitory computer-readable media of claim 8, further comprising sequences of instructions which, when executed using the one or more processors, cause the one or more processors to perform: generating the implicit observation data of the buyer computer from assessment data of the buyer computer, wherein the assessment data of the buyer computer relates to current relationships with supplier computers.

14. The one or more non-transitory computer-readable media of claim 8, wherein the tracking of the real-time digital electronic actions of the buyer computer on the one or more software platforms is during a single session, and the one or more processors is caused to perform: in response to performing the tracking, obtaining the context data of the buyer computer based on the tracking, wherein the context data of the buyer computer relates to the real-time digital electronic actions of the buyer computer on the one or more software platforms.

15. A computer system comprising:
   one or more processors; and
   one or more non-transitory computer-readable media storing one or more sequences of instructions which, when executed using one or more processors, cause the one or more processors to perform:
   during digital electronic interactions of a buyer computer with one or more software platforms and without receiving an explicit request for recommendations from the buyer computer,
      automatically tracking real-time digital electronic actions of the buyer computer on the one or more software platforms;
      automatically generating implicit observation data of the buyer computer from context data of the buyer computer, the context data of the buyer computer relating to the real-time digital electronic actions of the buyer computer on the one or more software platforms;
      processing the implicit observation data to extract one or more keywords;
      determining that the one or more keywords comprise a commodity term;
      cross-referencing, using a trained machine-learning classifier, the commodity term to a plurality of sourcing event records corresponding to a plurality of active sourcing events that are not yet closed and in which a plurality of buyer computers can participate;
      automatically determining one or more active sourcing events from the plurality of active sourcing events, based on at least the implicit observation data of the buyer computer;
      generating, using a coding computer, one or more electronic collaboration rooms for each of the one or more active sourcing events; and
      displaying, using the coding computer, the one or more electronic collaboration rooms in a GUI of the buyer computer, each of the one or more electronic collaboration rooms comprising a message board to communicate with one or more participants of a respective active sourcing event and comprising a list of current and former participants of the respective active sourcing event;
      updating, using the coding computer, a status of the respective active sourcing event in a corresponding electronic collaboration room in the GUI of the buyer computer from a first status indicator to a second status indicator, wherein the first status indicator represents a status that one or more supplier computers is required to participate in the respective active sourcing event with the buyer computer, wherein the second status indicator represents a status that the respective active sourcing event has progressed to have sufficient information collected from the buyer computer to share with the one or more supplier computers in the respective active sourcing event.

16. The computer system of claim 15, further comprising sequences of instructions which, when executed using the one or more processors, cause the one or more processors to perform: in response to the buyer computer transmitting a message to request participation in a particular sourcing event among the one or more active sourcing events that are displayed in a graphical panel, causing a particular electronic collaboration room for the particular sourcing event to be displayed in the GUI; and granting authorization to the buyer computer to access a particular message board associated with the particular electronic collaboration room to communicate with one or more participants of the particular sourcing event.

17. The computer system of claim 15, wherein the real-time digital electronic actions of the buyer computer include creating a new sourcing event through a graphical panel in the GUI of the buyer computer.

18. The computer system of claim 17, further comprising sequences of instructions which, when executed using the one or more processors, cause the one or more processors to perform: displaying, using the coding computer, a new events section in the graphical panel of the GUI of the buyer computer for accessing the new sourcing event; searching for a sourcing event to participate in the graphical panel of the GUI of the buyer computer.

19. The computer system of claim 15, further comprising sequences of instructions which, when executed using the one or more processors, cause the one or more processors to perform: automatically generating the implicit observation data of the buyer computer from historical data of the buyer computer, wherein the historical data of the buyer computer specifies historical spending of the buyer computer in other transactions.

20. The computer system of claim 15, further comprising sequences of instructions which, when executed using the one or more processors, cause the one or more processors to perform: automatically generating the implicit observation data of the buyer computer from assessment data of the buyer computer, wherein the assessment data of the buyer computer relates to current relationships with supplier computers.

21. The computer system of claim 15, wherein the tracking of the real-time digital electronic actions of the buyer computer on the one or more software platforms is during a single session, and the one or more processors is caused to perform: in response to performing the tracking, obtaining the context data of the buyer computer based on the tracking, wherein the context data of the buyer computer relates to the real-time digital electronic actions of the buyer computer on the one or more software platforms.

\* \* \* \* \*